United States Patent
Orii et al.

(10) Patent No.: US 12,195,607 B2
(45) Date of Patent: Jan. 14, 2025

(54) SILICA COMPOSITE, RESIN COMPOSITION, AND RESIN FILM OR RESIN SHEET

(71) Applicant: FUJI SILYSIA CHEMICAL LTD., Kasugai (JP)

(72) Inventors: Ryuji Orii, Kasugai (JP); Shoji Hayashi, Kasugai (JP)

(73) Assignee: FUJI SILYSIA CHEMICAL LTD, Kasugai (JP)

( * ) Notice: Subject to any disclaimer, the term of this patent is extended or adjusted under 35 U.S.C. 154(b) by 0 days.

(21) Appl. No.: 18/273,134

(22) PCT Filed: Jan. 11, 2022

(86) PCT No.: PCT/JP2022/000507
§ 371 (c)(1),
(2) Date: Jul. 19, 2023

(87) PCT Pub. No.: WO2022/158329
PCT Pub. Date: Jul. 28, 2022

(65) Prior Publication Data
US 2024/0084108 A1    Mar. 14, 2024

(30) Foreign Application Priority Data
Jan. 25, 2021 (JP) ................. 2021-009562

(51) Int. Cl.
*C08K 9/04* (2006.01)
*C08K 3/36* (2006.01)

(52) U.S. Cl.
CPC ............. *C08K 9/04* (2013.01); *C08K 3/36* (2013.01); *C08K 2201/005* (2013.01); *C08K 2201/006* (2013.01)

(58) Field of Classification Search
CPC ...... C08K 9/04; C08K 3/36; C08K 2201/005; C08K 2201/006
USPC ...................................................... 524/494
See application file for complete search history.

(56) References Cited

U.S. PATENT DOCUMENTS 4,503,035 A * 3/1985 Pestka .................. C07K 14/665
                                                                435/69.51

FOREIGN PATENT DOCUMENTS

| JP | S5131235 B1 |   | 9/1976 |   |
|----|----|---|----|---|
| JP | H02145418 A | * | 6/1990 |   |
| JP | 2002173579 A | * | 6/2002 |   |
| JP | 2003012320 A | * | 1/2003 |   |
| JP | 2004203719 A |   | 7/2004 |   |
| JP | 2011006268 A |   | 1/2011 |   |
| JP | 2017226787 A |   | 12/2017 |   |
| JP | 2018065922 A |   | 4/2018 |   |
| JP | 2019163358 A | * | 9/2019 |   |
| KR | 1891057 B1 | * | 8/2018 | ............. B32B 15/04 |

OTHER PUBLICATIONS

Eprogen Size Exclusion Promigen Life Sciences Publication (Year: 2017).*
International Search Report received in PCT/JP2022/000507, Machine English translation, mail date Mar. 15, 2022, 5 pages.
PCT International Preliminary Report on Patentability with Written Opinion received in PCT/JP2022/000507, Machine English translation, mail date Aug. 3, 2023, 9 pages.
Notice of Reasons for Refusal received in Japanese Patent Application No. 2021-009562, Machine English translation, mail date Apr. 27, 2021, 6 pages.
European Search Report, Date of completion of the Search Apr. 3, 2024, received in the corresponding European Patent Application No. 22742451, 8 pages.

* cited by examiner

*Primary Examiner* — Kelechi C Egwim
(74) *Attorney, Agent, or Firm* — Hayes Soloway PC

(57) ABSTRACT

Provided is a silica composite to be dispersed uniformly in a resin composition. The silica composite includes a silica and a polyhydric alcohol bonded to or adsorbed on the silica, and is a silica composite for an additive for a paint, an additive for an ink, or an anti-blocking agent for a resin film or resin sheet.

7 Claims, No Drawings

SILICA COMPOSITE, RESIN COMPOSITION, AND RESIN FILM OR RESIN SHEET

CROSS-REFERENCE TO RELATED APPLICATIONS

This patent application claims priority from PCT Patent Application No. PCT/JP2022/000507 filed Jan. 11, 2022, which claims priority from Japanese Patent Application No. 2021-009562 filed on Jan. 25, 2021. Each of these patent applications are herein incorporated by reference in their entirety.

TECHNICAL FIELD

The present disclosure relates to a silica composite, a resin composition, and a resin film or resin sheet.

BACKGROUND ART

Silica is used in various applications, such as additives to be blended into paints or inks, anti-blocking agents for resin films or resin sheets, and others.

Silica may be surface-treated with a specific compound for the purpose of imparting various properties to silica. For example, Patent Document 1 describes that silica is surface-treated with wax in order to improve the precipitation behavior of silica in paints.

PRIOR ART DOCUMENTS

Patent Documents

Patent Document 1: Japanese Examined Patent Publication No. S51-31235

SUMMARY OF THE INVENTION

Problems to be Solved by the Invention

According to the studies by the present inventors, silica surface-treated with wax tends to associate in a resin composition to form aggregates. Thus, in a case where, for example, silica is added as a matting agent for paints or inks, there is a possibility that non-uniform asperities are formed on the surface of the formed coating film or ink film, thus failing to be a nicely matted surface. Also, in a case where, for example, silica is added as an anti-blocking agent for resin films or resin sheets, there is a possibility that so-called fish eyes or the like caused by aggregates are generated on the surface of the formed resin films or resin sheets. In such a case, qualities such as outer appearance, film strength, and so forth are decreased.

One aspect of the present disclosure is to provide silica to be dispersed uniformly in a resin composition. Moreover, one aspect of the present disclosure is to provide a resin composition, and a resin film or resin sheet that contain such silica.

Means for Solving the Problems

One aspect of the present disclosure is a silica composite for an additive for a paint, an additive for an ink, or an anti-blocking agent for a resin film or resin sheet. The silica composite comprises a silica and a polyhydric alcohol bonded to or adsorbed on the silica.

In one aspect of the present disclosure, the polyhydric alcohol may comprise a trihydric alcohol.

In one aspect of the present disclosure, the polyhydric alcohol may comprise at least one selected from a group consisting of glycerol, trimethylolethane, and trimethylolpropane.

In one aspect of the present disclosure, the polyhydric alcohol may comprise at least one selected from a group consisting of trimethylolethane and trimethylolpropane.

In one aspect of the present disclosure, a content of the polyhydric alcohol in the silica composite may be 0.1% by mass or more and 30% by mass or less.

In one aspect of the present disclosure, in the silica composite, a percentage of a BET specific surface area determined by a water vapor adsorption method in a BET specific surface area determined by a nitrogen gas adsorption method may be 15% or more and 45% or less.

In one aspect of the present disclosure, a volume-average particle size of the silica composite may be 0.5 μm or more and 20 μm or less.

In one aspect of the present disclosure, the silica may comprise a wet process silica.

One aspect of the present disclosure is a resin composition, and comprises the silica composite described above.

One aspect of the present disclosure is a resin film or resin sheet, and comprises a silica composite described above for an anti-blocking agent for a resin film or resin sheet.

In another aspect of the present disclosure, a silica composite may be provided that is for an additive for a paint, an additive for an ink, or an anti-blocking agent for a resin film or resin sheet and that comprises a silica and at least one alcohol selected from the group consisting of a monohydric alcohol, and a polyhydric alcohol and a derivative thereof, bonded to or adsorbed on the silica.

Effects of the Invention

According to one aspect of the present disclosure, silica to be dispersed uniformly in a resin composition is provided. Moreover, according to one aspect of the present disclosure, a resin composition, and a resin film or resin sheet that contain such silica are provided.

MODE FOR CARRYING OUT THE INVENTION

Explanations will be sequentially given below as to a silica composite, a resin composition, and a resin film or resin sheet according to one aspect of the present disclosure.
<Silica Composite>

The silica composite contains silica and a polyhydric alcohol bonded to or adsorbed on the silica. Such a silica composite can be suitably used as an additive for paints, an additive for inks, or an anti-blocking agent for resin films or resin sheets. The silica composite may be a silica composite containing silica and at least one alcohol selected from the group consisting of a monohydric alcohol, and a polyhydric alcohol and a derivative thereof, bonded to or adsorbed on the silica.

The silica composite can be obtained by surface-treating silica with the alcohol described above. It is considered that, by surface-treating silica with the alcohol, hydroxyl groups of the alcohol are bonded to silanol groups on the silica surface, or the alcohol is adsorbed on the silica surface. The alcohol as referred to here may be understood as a polyhydric alcohol. The same applies hereinafter.

It is considered that, on the surface of such a silica composite, hydrophobic groups, such as alkyl groups derived from the alcohol, and hydrophilic groups, such as hydroxyl groups derived from the alcohol and silanol groups on the silica surface, are arranged adequately. Such a surface has a high affinity with a resin component generally contained in paints, inks, or resin films or resin sheets, and thus, the silica composite is dispersed uniformly in the resin composition to inhibit mutual aggregation of the silica composite.

Consequently, for example when the silica composite is added as a matting agent for paints or inks, uniform asperities are formed on the surface of the formed coating film, resulting in a smoothly matted surface with a good texture. Especially when the silica composite is added as a matting agent for inks, higher-resolution printings can be obtained. Further, for example when the silica is added as an anti-blocking agent for resin films or resin sheets, the resulting resin films or resin sheets are unlikely to have fish eyes, unevenness, streaks, and the like.

There are cases where, when a paint containing a silica composite surface-treated with wax or the like is applied twice, a phenomenon occurs in which the paint applied over is repelled. This is considered to be because the surface condition of the coating film changes due to a factor including release of an organic matter such as wax on the silica surface from the silica as a result of merging in a more compatible resin component.

On the other hand, in the case where the paint containing the silica composite surface-treated with the specific alcohol described above is applied twice, the paint applied over is unlikely to be repelled.

The silica composite will be described below in detail.

As the silica, porous silica is preferred because it is suitable for use in an additive for paints, an additive for inks, and an anti-blocking agent for resin films or resin sheets. An example of the porous silica may include wet process silica produced by a wet process. Specifically, examples of the wet process silica may include precipitated silica, silica gel, and so forth. Silica gel is preferred as the silica because it is more suitable for use in an additive for paints, an additive for inks, and an anti-blocking agent for resin films or resin sheets.

Examples of the alcohol may include, as described above, a monohydric alcohol, a polyhydric alcohol, and a derivative of the polyhydric alcohol.

Examples of the monohydric alcohol may include a monohydric saturated or unsaturated aliphatic alcohol, a monohydric aromatic alcohol, etc. Examples of the monohydric alcohol may include methanol, ethanol, 1-propanol, 2-propanol, 1-butanol, isobutyl alcohol, s-butanol, t-butanol, 1-pentanol, 2-pentanol, 3-methyl-1-butanol, 1-hexanol, 2-hexanol, 2-ethyl-1-butanol, 1-octanol, 2-octanol, 2-ethyl-1-hexanol, cyclohexanol, pinacolyl alcohol, benzyl alcohol, isopentenyl alcohol, 3,3-dimethylallyl alcohol, crotyl alcohol, β-methallyl alcohol, sorbyl alcohol, etc. The carbon number of the monohydric alcohol is preferably 1 or more and 10 or less, and more preferably 1 or more and 4 or less.

Examples of the polyhydric alcohol may include ethylene glycol, 1,4-butanediol, 2-methyl-1,3-propanediol, 1,5-pentanediol, 3-methyl-1,5-pentanediol, 2,2-dimethyl-1,3-propanediol, 1,2-hexanediol, 2-methyl-2,4-pentanediol, 1,2-cyclohexanediol, 1,4-cyclohexanediol, pinacol, diethylene glycol, triethylene glycol, tetraethylene glycol, propylene glycol, tripropylene glycol, glycerol, diglycerol, triglycerol, trimethylolethane, trimethylolpropane, pentaerythritol, dipentaerythritol, tripentaerythritol, sorbitol, sucrose, etc. The carbon number of the polyhydric alcohol is preferably 2 or more and 10 or less, and more preferably 3 or more and 7 or less.

Examples of the derivative of the polyhydric alcohol may include compounds in which a portion of the hydroxyl groups of the polyhydric alcohol is alkyl-etherified, etc. Examples of the derivative of the polyhydric alcohol may include ethylene glycol monomethyl ether, ethylene glycol monoethyl ether, ethylene glycol monopropyl ether, ethylene glycol monobutyl ether, ethylene glycol monohexyl ether, ethylene glycol monophenyl ether, carbitol, ethyl carbitol, butyl carbitol, triethylene glycol monomethyl ether, triethylene glycol monoethyl ether, triethylene glycol monobutyl ether, propylene glycol monomethyl ether, propylene glycol monoethyl ether, propylene glycol monobutyl ether, dipropylene glycol monomethyl ether, dipropylene glycol monoethyl ether, dipropylene glycol monobutyl ether, tripropylene glycol monomethyl ether, etc.

Among these, a trihydric alcohol is preferred as the alcohol. As compared with the monohydric alcohol or the dihydric alcohol, the trihydric alcohol is considered to have more hydroxyl groups present on the surface of the silica composite without being involved in bonding to or adsorption on the silica. Consequently, the balance between the hydrophobic groups and the hydrophilic groups present on the surface of the silica composite is moderate, and thus, the silica composite is dispersed more uniformly in the resin composition. Among the trihydric alcohols, at least one selected from the group consisting of glycerol, trimethylolethane, and trimethylolpropane is preferred as the alcohol, and at least one selected from the group consisting of trimethylolethane and trimethylolpropane is more preferred.

The content of the alcohol in the silica composite is preferably 0.1% by mass or more, and more preferably 2% by mass or more because the silica composite is dispersed more uniformly in the resin composition. Further, since there is a limit to the amount of the alcohol bonded to or adsorbed on the silica, the content of the alcohol in the silica composite is preferably 30% by mass or less, and more preferably 15% by mass or less.

In the silica composite, the percentage of the BET specific surface area determined by a water vapor adsorption method in the BET specific surface area determined by a nitrogen gas adsorption method is preferably 15% or more and 45% or less, more preferably 25% or more and 42% or less, and still more preferably 25% or more and 40% or less. This percentage is an indicator that indicates the degree of hydrophilicity/hydrophobicity of the measured substance, and the greater the value is, the higher the hydrophilicity is. Hereinafter, this percentage is referred to as a "hydrophilic surface percentage". In the silica composite, the greater the number of silanol groups, hydroxyl groups derived from the alcohol, ether bonds derived from the alcohol derivative, and so forth on the silica surface is, the greater the value of the hydrophilic surface percentage is. When, the hydrophilic surface percentage is in the ranges described above, the degree of hydrophilicity/hydrophobicity on the surface of the silica composite is adequate, resulting in more uniform dispersion of the silica composite in the resin composition.

In the silica composite, the BET specific surface area determined by a nitrogen gas adsorption method is preferably 50 $m^2/g$ or more and 800 $m^2/g$ or less, more preferably 100 $m^2/g$ or more and 550 $m^2/g$ or less, and still more preferably 200 $m^2/g$ or more and 350 $m^2/g$ or less. The silica composite having the BET specific surface area in such ranges is suitable for use in an additive for paints, an additive for inks, and an anti-blocking agent for resin films or resin sheets.

The pore volume of the silica composite is preferably 0.3 $cm^3/g$ or more and 2.2 $cm^3/g$ or less, and more preferably 0.5 cm³/g or more and 2.0 cm³/g or less. The pore volume as referred to here is a value obtained by converting, in terms of liquid, the amount of adsorbed nitrogen gas at a relative pressure of 0.99 on a nitrogen gas adsorption isotherm.

The average pore size of the silica composite is preferably 2 nm or more and 75 nm or less, and more preferably 5 nm or more and 30 nm or less. The average pore size can be calculated from the above-described pore volume and the above-described BET specific surface area determined by a nitrogen gas adsorption method.

The volume-average particle size of the silica composite is preferably 0.5 µm or more and 20 µm or less, more preferably 1 µm or more and 15 µm or less, and still more preferably 2 µm or more and 8 µm or less. When the volume-average particle size is in such ranges, it is possible to form adequately-sized asperities on the surface of, for example, coating films, ink films, or resin films or resin sheets. Generally, aggregation tends to occur in silica having the above-described relatively small volume-average particle size; however, such aggregation can be inhibited by surface-treating the silica with the alcohol described above. The volume-average particle size as referred to here is a value measured using a particle size distribution measuring device based on a laser diffraction scattering method in aqueous solution.

A method for producing the silica composite is not particularly limited. For example, the silica composite can be obtained by drying and pulverizing a pasty mixture obtained by mixing silica and a solution containing alcohol. Alternatively, for example, the silica composite may be obtained by adding a specific amount of alcohol to a silica slurry liquid in advance during a wet process and spray-drying the resulting mixed slurry liquid. Alternatively, for example, the silica composite may be obtained by mixing the silica slurry liquid obtained by the wet process with alcohol by means of a high-speed flow mixer or the like and drying and pulverizing the mixture.

The amount of the alcohol used relative to silica is preferably 0.5 parts by mass or more based on 100 parts by mass of silica, and more preferably 2.0 parts by mass or more. When the amount of the alcohol used is 0.5 parts by mass or more based on 100 parts by mass of silica, the silica composite is dispersed more uniformly in the resin composition. Further, the amount of the alcohol used relative to silica is preferably 12.0 parts by mass or less based on 100 parts by mass of silica, and more preferably 6.0 parts by mass or less. This is because the amount of the alcohol used of 12.0 parts by mass or more based on 100 parts by mass of silica does not result in greatly increasing an effect of improving dispersibility.

As described above, the silica composite can be suitably used as an additive for paints, an additive for inks, or an anti-blocking agent for resin films or resin sheets. The additive as referred to here refers to anything to be added in paints or inks for some purpose. Examples of the additive may include a matting agent and so forth in the case of paints, and a matting agent, pigment, and so forth in the case of inks.

<Resin Composition>

The resin composition contains the silica composite described above. Examples of the resin composition may include paints, inks, compositions for forming resin films or resin sheets, etc. The compositions for forming resin films or resin sheets refer to raw materials for forming resin films or resin sheets. Examples of the form of the resin composition may include paste, pellet, plate, grain, liquid, etc.

The content of the silica composite in the resin composition can be set as appropriate in consideration of the intended use of the silica composite, physical properties required for the silica composite, and other factors.

As an example, the content of the silica composite in the case where the resin composition is a paint or ink is preferably 0.5% by mass or more, and more preferably 1% by mass or more. When the content of the silica composite is 0.5% by mass or more, it is easier to achieve desired physical properties, for example, a desired degree of matting when used as a matting agent. Further, as an example, the content of the silica composite is preferably 20% by mass or less, and more preferably 15% by mass or less.

As an example, the content of the silica composite in the case where the resin composition is a composition for forming resin films or resin sheets is preferably 50 ppm (0.005% by mass) or more, and more preferably 100 ppm (0.01% by mass) or more. When the content of the silica composite is 50 ppm or more, it is easier to obtain effects as an anti-blocking agent. Further, as an example, the content of the silica composite is preferably 10,000 ppm (1% by mass) or less, and more preferably 5,000 ppm (0.5% by mass) or less.

Especially, the silica composite can be suitably used for the purpose of improving the surface properties of the resulting coating films, ink films, or resin films or resin sheets, etc., specifically as a matting agent for paints, a matting agent for inks, or an anti-blocking agent for resin films or resin sheets, etc.

The paints, inks, or resin films or resin sheets may contain as appropriate various components generally blended into paints, inks, or resin films or resin sheets, in addition to a resin component to serve as a binder. Examples of the resin component to be blended into paints or inks may include an acrylic resin, a cellulose-based resin, a urethane resin, an alkyd resin, an epoxy resin, a melamine resin, etc. Examples of the resin component to be blended into a composition for forming resin films or resin sheets may include an acrylic resin, a nylon resin, PET resin, PP resin, PE resin, etc. The resin component to be blended into the composition for forming resin films or resin sheets is preferably at least one selected from the group consisting of a nylon resin, an acrylic resin, and PET resin because of their higher affinity with the silica composite.

<Resin Film or Resin Sheet>

The resin film or resin sheet contains the silica composite described above. The resin film or resin sheet can be produced using the resin composition described above. The resin film or resin sheet may be configured with a single layer, or may be configured with a plurality of layers including another layer.

EXAMPLES

One aspect of the present disclosure will be described below by giving examples; however, the present disclosure is not limited to the following examples.

Example 1

1. Preparation of Silica Composite

A 1% by mass aqueous solution of trimethylolethane (TME) was prepared. 4 g of silica gel ("SYLYSIA (registered trademark) 350" manufactured by Fuji Silysia Chemical Ltd.) was added to and mixed with 20 g of the 1% by mass aqueous solution of trimethylolethane to obtain a pasty mixture. The resulting mixture was dried at 110 degrees in a drier. The resulting dried product was pulverized to obtain a silica/TME composite with a volume-average particle size of 3.9 μm.

2. Preparation of Paint 100 g of acrylic resin paint (manufactured by SK KAKEN Co., Ltd.) and 3 g of the silica/TME composite were placed in a bottle and stirred for 5 minutes at 1000 rpm with a homodisper (manufactured by PRIMIX Corporation), and the stirred product was left at rest for 1 hour for defoaming.

In addition, a paint prepared with the rotational speed changed to 3000 rpm was also provided.

Example 2

In the same manner as in Example 1 except that the concentration of the trimethylolethane aqueous solution was 2% by mass, a silica/TME composite with a volume-average particle size of 3.9 μm and a paint were obtained.

Example 3

In the same manner as in Example 1 except that the concentration of the trimethylolethane aqueous solution was 0.6% by mass, a silica/TME composite with a volume-average particle size of 3.9 μm and a paint were obtained.

Example 4

In the same manner as in Example 1 except that trimethylolpropane (TMP) was used instead of trimethylolethane, a silica/TMP composite with a volume-average particle size of 3.9 μm and a paint were obtained.

Example 5

In the same manner as in Example 1 except that glycerol was used instead of trimethylolethane, a silica/glycerol composite with a volume-average particle size of 3.9 μm and a paint were obtained.

Example 6

In the same manner as in Example 1 except that silica gel ("SYLYSIA (registered trademark) 440" manufactured by Fuji Silysia Chemical Ltd.) was used instead of the silica gel ("SYLYSIA (registered trademark) 350" manufactured by Fuji Silysia Chemical Ltd.), a silica/TME composite with a volume-average particle size of 6.2 vim and a paint were obtained.

Comparative Example 1

Silica gel not surface-treated ("SYLYSIA (registered trademark) 350" manufactured by Fuji Silysia Chemical Ltd.) was provided. A paint was prepared in the same manner as in Example 1.

Comparative Example 2

Silica gel not surface-treated ("SYLYSIA (registered trademark) 440" manufactured by Fuji Silysia Chemical Ltd.) was provided. A paint was prepared in the same manner as in Example 1.

Comparative Example 3

Silica gel surface-treated with a wax-based organic matter ("SYLYSIA (registered trademark) 446" manufactured by Fuji Silysia Chemical Ltd.) was provided. A paint was prepared in the same manner as in Example 1.

Comparative Example 4

Silica gel surface-treated with a silylation agent ("SYLOPHOBIC (registered trademark) 200" manufactured by Fuji Silysia Chemical Ltd.) was provided. A paint was prepared in the same manner as in Example 1.

Evaluations

Evaluations described below were performed. The evaluation results are shown in Table 1. For the sake of simplification, the number of aggregated particles was not evaluated for Examples 4 to 6 and Comparative Examples 2 to 4.

<Measurement of BET Specific Surface Area>

The relative pressure of nitrogen gas and the amount of adsorbed nitrogen gas molecules at liquid nitrogen temperature (−196° C.), and the relative pressure of water vapor and the amount of adsorbed water vapor molecules at 25° C., were measured using a high-precision gas adsorption amount measuring device ("BELSORP (registered trademark)-max" manufactured by BEL JAPAN, Inc. (now MicrotracBEL Corp.)). BET plots were obtained from the resulting nitrogen gas adsorption isotherm and water vapor adsorption isotherm. The respective specific surface areas were calculated from the slopes of the straight lines in the relative pressure range of 0.05 to 0.30 in the BET plots.

Also calculated was the percentage of the BET specific surface area determined from the water vapor adsorption isotherm in the BET specific surface area determined from the nitrogen gas adsorption isotherm (i.e., hydrophilic surface percentage).

<Number of Aggregated Particles>

Each of the prepared paints was applied onto a grind gauge (manufactured by Taiyu Kizai Co., Ltd.) with a groove depth of 0 μm or more and 100 μm or less, and the number of aggregated particles observed in a part of 40 μm or more and 100 μm or less was counted.

<Condition of Coating Film Surface>

Each of the prepared paints was applied onto an entirely black hiding rate measuring paper with a 4-mil applicator, and the coating film surface was visually observed under a standard light source to evaluate the smoothness of the coating film. The evaluation criteria were as below.

A: Smooth surface with uniform and fine asperities formed thereon

B: Generally smooth surface with generally uniform and fine asperities formed thereon despite slightly rough asperities observed a little C: Smoothness not so sufficient with slightly rough asperities observed together with fine asperities D: Smoothness not sufficient with slightly rough asperities observed a lot together with fine asperities

TABLE 1

| | SA (m²/g) ① Water vapor | SA (m²/g) ② N₂ gas | Hydrophilic surface percentage ①/② (%) | Number of aggregated particles Rotational speed 3000 rpm | Number of aggregated particles Rotational speed 1000 rpm | Condition of coating film surface Rotational speed 3000 rpm | Condition of coating film surface Rotational speed 1000 rpm |
|---|---|---|---|---|---|---|---|
| Example 1 | 83 | 266 | 31.2 | 0 | 7 | A | A |
| Example 2 | 60 | 232 | 25.9 | 0 | 3 | A | A |
| Example 3 | 112 | 266 | 42.1 | 1 | 22 | A | B |
| Example 4 | 74 | 244 | 30.3 | | | A | A |
| Example 5 | 86 | 294 | 29.3 | | | A | A |
| Example 6 | 90 | 264 | 34.1 | | | A | A |
| Comparative Example 1 | 130 | 287 | 45.4 | 2 | 80 | B | D |
| Comparative Example 2 | 135 | 290 | 46.6 | | | B | D |
| Comparative Example 3 | 106 | 207 | 51.2 | | | B | D |
| Comparative Example 4 | 31 | 265 | 11.7 | | | A | C |

Considerations

The paints obtained in Examples 1 to 6 were excellent in smoothness of the coating film surface and excellent in matting performance and texture when used as coating films for finishing.

On the other hand, the paints obtained in Comparative Examples 1 to 4 had non-uniform asperities observed on the coating film surface, which had been caused by aggregation of silica, especially when prepared with the rotational speed of 1000 rpm.

Comparison between Examples 1 to 3 shows that Example 1 was more excellent than Example 3, and that Example 2 was even more excellent in terms of smoothness of the coating film surface.

The invention claimed is:

1. A silica composite comprising:
    a silica; and
    a polyhydric alcohol bonded to or adsorbed on the silica;
    wherein the silica composite is used as an additive for a paint, an additive for an ink, or an anti-blocking agent for a resin film or resin sheet;
    wherein a content of the polyhydric alcohol in the silica composite is 2% by mass or more and 15% by mass or less;
    wherein, in the silica composite, a percentage of a BET specific surface area determined by a water vapor adsorption method in a BET specific surface area determined by a nitrogen gas adsorption method is 25% or more and 40% or less;
    wherein, in the silica composite, the BET specific surface area determined by the nitrogen gas adsorption method is 100 m²/g or more and 550 m²/g or less;
    wherein a volume-average particle size of the silica composite is 1 μm or more and 15 μm or less;
    wherein a pore volume of the silica composite is 0.5 cm³/g or more and 2.0 cm³/g or less; and
    wherein an average pore size of the silica composite is 5 nm or more and 30 nm or less.

2. The silica composite according to claim 1, wherein the polyhydric alcohol comprises a trihydric alcohol.

3. The silica composite according to claim 1, wherein the polyhydric alcohol comprises at least one selected from a group consisting of glycerol, trimethylolethane, and trimethylolpropane.

4. The silica composite according to claim 1, wherein the polyhydric alcohol comprises at least one selected from a group consisting of trimethylolethane and trimethylolpropane.

5. The silica composite according to claim 1, wherein the silica comprises a wet process silica.

6. A resin composition comprising a silica composite according to claim 1.

7. A resin film or resin sheet comprising a silica composite for an anti-blocking agent for a resin film or resin sheet according to claim 1.

* * * * *